United States Patent [19]

Neukom et al.

[11] 4,006,833
[45] Feb. 8, 1977

[54] LOWERING DEVICE FOR UNLOADING OR LOADING HAYSTACKS

[75] Inventors: Chester G. Neukom, Jamestown; Ivyl D. Kopecky, Ypsilanti, both of N. Dak.

[73] Assignee: Haybuster Manufacturing Inc., Jamestown, N. Dak.

[22] Filed: June 25, 1975

[21] Appl. No.: 590,392

[52] U.S. Cl. .............................. 214/506; 280/43.23
[51] Int. Cl.[2] .......................................... B60P 1/04
[58] Field of Search ............ 214/505, 506, 84, 521; 280/43.18, 43.23; 298/11

[56] References Cited

UNITED STATES PATENTS

| | | | |
|---|---|---|---|
| 2,835,399 | 5/1958 | Buchholz | 214/506 |
| 2,835,400 | 5/1958 | Latzke | 280/43.23 |
| 2,876,922 | 3/1959 | Holiday | 214/506 |
| 3,635,492 | 1/1972 | Mauldin | 214/506 |
| 3,720,052 | 3/1973 | Anderson et al. | 214/521 |
| 3,831,210 | 8/1974 | Ow | 214/506 |
| 3,856,319 | 12/1974 | Hardy | 280/43.23 |

Primary Examiner—Trygve M. Blix
Assistant Examiner—Jesus D. Sotelo
Attorney, Agent, or Firm—Dugger, Johnson & Westman

[57] ABSTRACT

A wheel support arrangement for use on haystacking machines which permits lowering the bed of the haystacking machine so that stacks formed can be unloaded, and also so that stacks can be reloaded conveniently for hauling from one place to another if desired. Thus, the haystacking machine is used either as a stacker and unloader, or as a stack mover which can load existing stacks and move them to a different location. The lowering device involves the pivoting of an axle mounting the wheels for the stacker, and includes safety stop members to prevent the wheels from accidently lowering.

7 Claims, 5 Drawing Figures

LOWERING DEVICE FOR UNLOADING OR LOADING HAYSTACKS

BACKGROUND OF THE INVENTION

1. Field of the Invention

The present invention relates to wheel mounting devices for haystackers and stack movers.

2. Prior Art

Haystackers which use rotary platforms for forming loose haystacks have been known, and are shown in U.S. Pat. No. 3,720,052, issued to Joseph A. Anderson et al. on Mar. 13, 1973. As shown in that patent, the bed used for forming the stack must be adapted so that it can in some way permit removal of the stack after it has been formed. It is also mentioned in that patent that the device can be used as a haystack mover if a loading means is provided for reloading the haystack onto the bed.

One of the problems in unloading and loading stacks is to simplify the mechanism necessary to get the stack bed in a position adjacent to the ground so that the stack may be easily unloaded, or easily reloaded if the device is to be used as a stack mover. In the above mentioned patent, the frame itself is made so that the rear portions of the bed may be pivoted downwardly. This involves a substantial amount of additional bracing and structure, and while suitable for large stackmakers, the additional requirements result in an increase in the cost of the unit, which is objectionable in smaller units.

Another type of lowering device in a haystack forming machine is shown in U.S. Pat. No. 3,698,767 which provides for hydraulic cylinders that directly raise and lower wheels which in turn are guided on a framework. However, this type of structure involves heavy overhead framework, and where such heavy overhead framework is not required for the stack forming machine, additional expense is involved.

SUMMARY OF THE INVENTION

The present invention relates to a device for raising and lowering the frame of a haystack forming and moving machine, which incorporates a pivoting cross tube extending across the frame, arms extending from the tube on opposite sides of the frame, which in turn each carry a support wheel, and a hydraulic cylinder for pivoting the cross tube to raise or lower the wheels relative to the frame. A heavy cross tube is required because of the weight involved, and the arms on which the wheels are mounted are kept relatively short. In addition, suitable lock members are provided for positively locking the wheels into position relative to the frame when in a working position with the frame raised. The lock members can be manually released upon operation of the hydraulic control cylinder in a first direction, and upon reverse operation of the cylinder, the frame can be lowered as the wheels are permitted to move relative to the frame.

The device is sturdy, and relatively inexpensive. It is safe and easily operated and permits the movement of the frame down to a position adjacent to the ground for ease of loading and unloading haystacks.

When used in combination with a haystack forming machine having a rotary bed, suitable wheel wells are provided in the bed to permit the wheels to assume a position above the level of the bed when the frame is lowered. These wheel wells are provided in outer sections only of the rotating bed, so that the bed has to be properly positioned before unloading the stack when this type of a rotating bed is employed.

BRIEF DESCRIPTION OF THE DRAWINGS

FIG. 5 is a top part schematic view of a frame for the stack former having an axle made according to the present invention installed thereon.

DESCRIPTION OF THE PREFERRED EMBODIMENT

Figure 1:
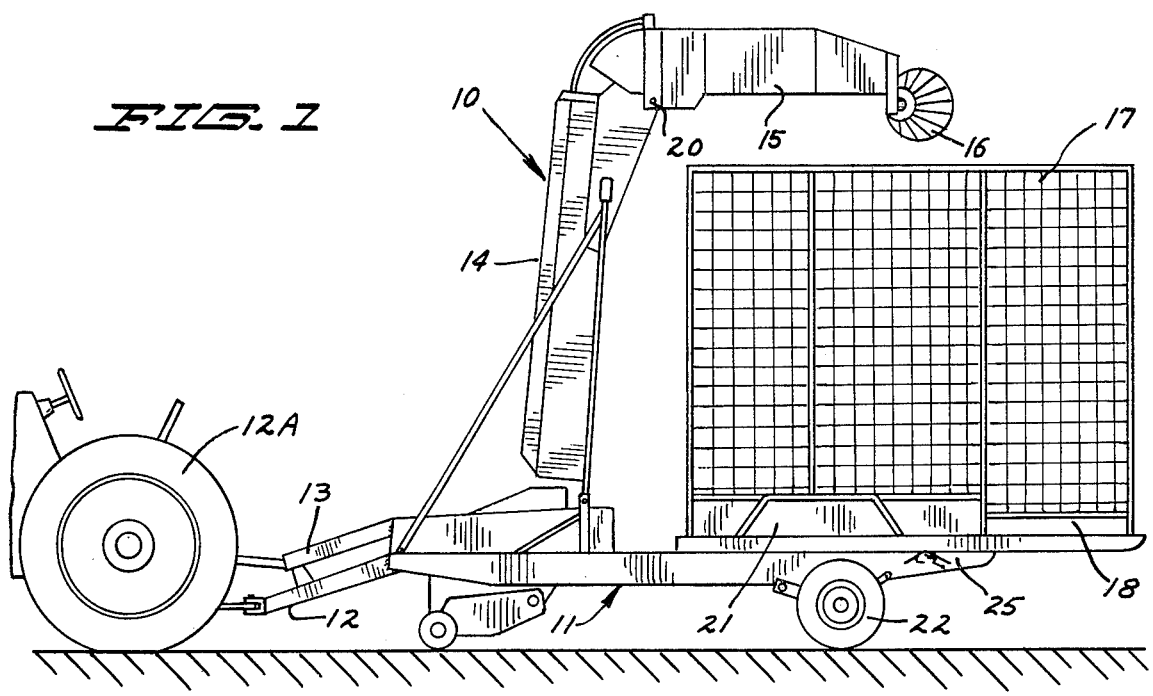
FIG. 1 is a typical rotary platform haystack forming machine as schematically shown, and embodying a frame lowering mechanism made according to the present invention.
Figure 2:
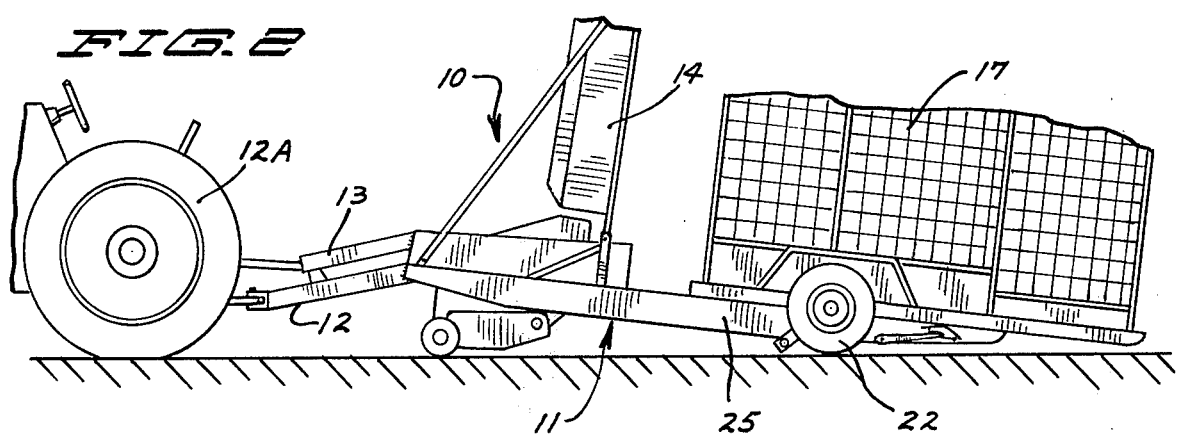
FIG. 2 is a fragmentary side elevational view of the device of FIG. 1 showing the frame in a lowered position.

A hay or other forage crop stacking machine shown generally at 10 is shown in FIG. 1 in its stack forming position. The machine includes a main frame assembly 11, a tongue 12 that is attached to the hitch pole of a tractor 12A, and means to power the machine from the tractor such as a power take-off shaft 13. The power drive will drive crop pick-up means and loading means which moves the hay through a loading chute 14, and into a transverse pivoting chute 15, carrying a hay packer drum 16. The hay will be dropped into a cage 17 and it can be packed as the cage is rotated through the use of a rotating bed assembly 18. The drive for the bed assembly is not shown, but it is to be understood that this rotates about an upright axis as hay is deposited from the conveyor. The transverse chute 15 is pivoted about a pivot 20, and controlled in the manner described in U.S. Pat. No. 3,720,052 to exert the packing pressure as hay is deposited. The cage member 17 provides a form for the stack, and the lateral side portions of the rotating platform 18 are provided with wheel wells 21 that are raised above the general level of the platform. When the rotating platform 18 is positioned as shown in FIGS. 1 and 2, the wheel wells are adjacent the lateral sides of the machine, and will extend outwardly from the main frame assembly 11 so that they are overlying support wheels 22 on opposite sides of the machine.

Referring specifically to FIG. 5, which is a schematic representation of the frame, a pivot tube 24 is pivotally mounted in suitable bearings to the longitudinal frame members 25 of the main frame assembly 11. These longitudinal members 25 are held together with suitble cross members, to form the frame assembly. The pivot tube 24 is positioned at the lower edges of the longitudinal frame members 25, and as shown, at the opposite ends of the pivot tube, there are lift arms 26,26 mounted. These lift arms 26,26 are welded to the pivot tube so that they will rotate with the tube.

At the outer ends of the arms 26, clamp members 27 are provided to clamp spindles 28, which in turn rotatably mount the wheel assemblies 22. The wheel assemblies include rubber tires, as shown, and suitable bearings for supporting the load. Thus, the frame is supported through the arms 26, spindles 28, and the wheels 22.

The rotation of the pivot tube 24 about its axis is restrained and controlled by a hydraulic cylinder assembly illustrated generally at 32. This cylinder assembly is a single acting hydraulic cylinder having an extendable and retractable rod 33, and having a base end 34 that is mounted to a suitable cross frame member 35 supported with respect to the frame assembly in a desired manner. The rod 33 is connected to a pair of levers 36 that are in turn welded to the pivot tube 24. Extension of the rod 33 controls the angular position of the pivot tube 24 about its axis. The rod will retract when the control valve for cylinder 32 releases pressure in the cylinder under the weight of the frame. Thus, the rotation of the tube 24 by use of the cylinder 32 will cause the arms 26 to be raised and permit them to lower relative to the frame, causing the wheels 22 also to be moved and thereby raising and permitting the lowering of the frame.

In order to provide a safety lock member, a wheel lock dog 40 is mounted on each side of the frame, and these dogs 40 are connected to a pivot tube 41 that extends across the frame. The pivot tube 41 has a rope guide quadrant 42 thereon which has a control rope 43 attached thereto leading up to the operator's platform of the tractor. Pulling on the rope 43 will cause the tube 41 to rotate counterclockwise as viewed in FIGS. 2, 3 and 4.

Figure 3:
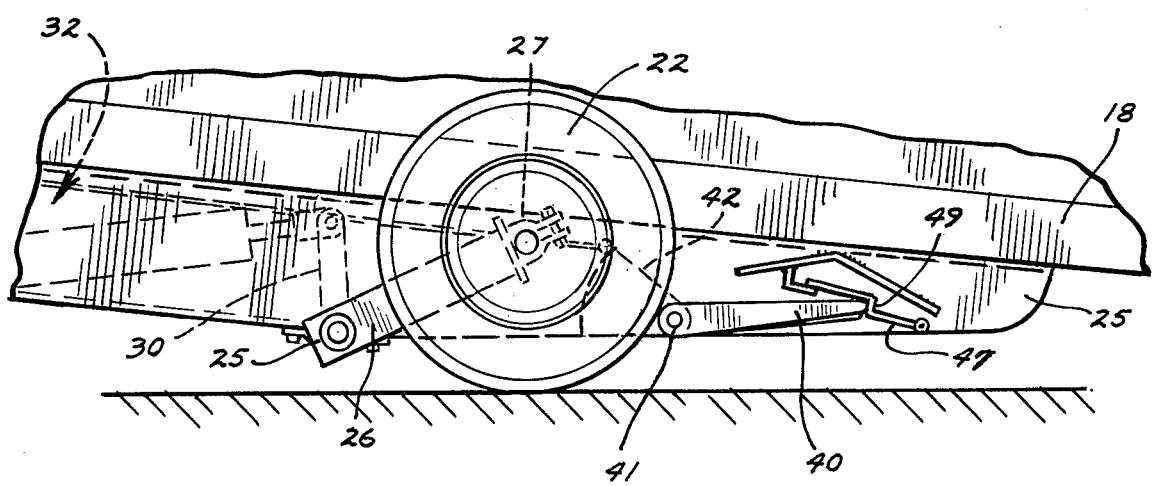
FIG. 3 is a fragmentary enlarged side sectional view of the device with the wheels in a fully raised position for loading and unloading.
Figure 3:
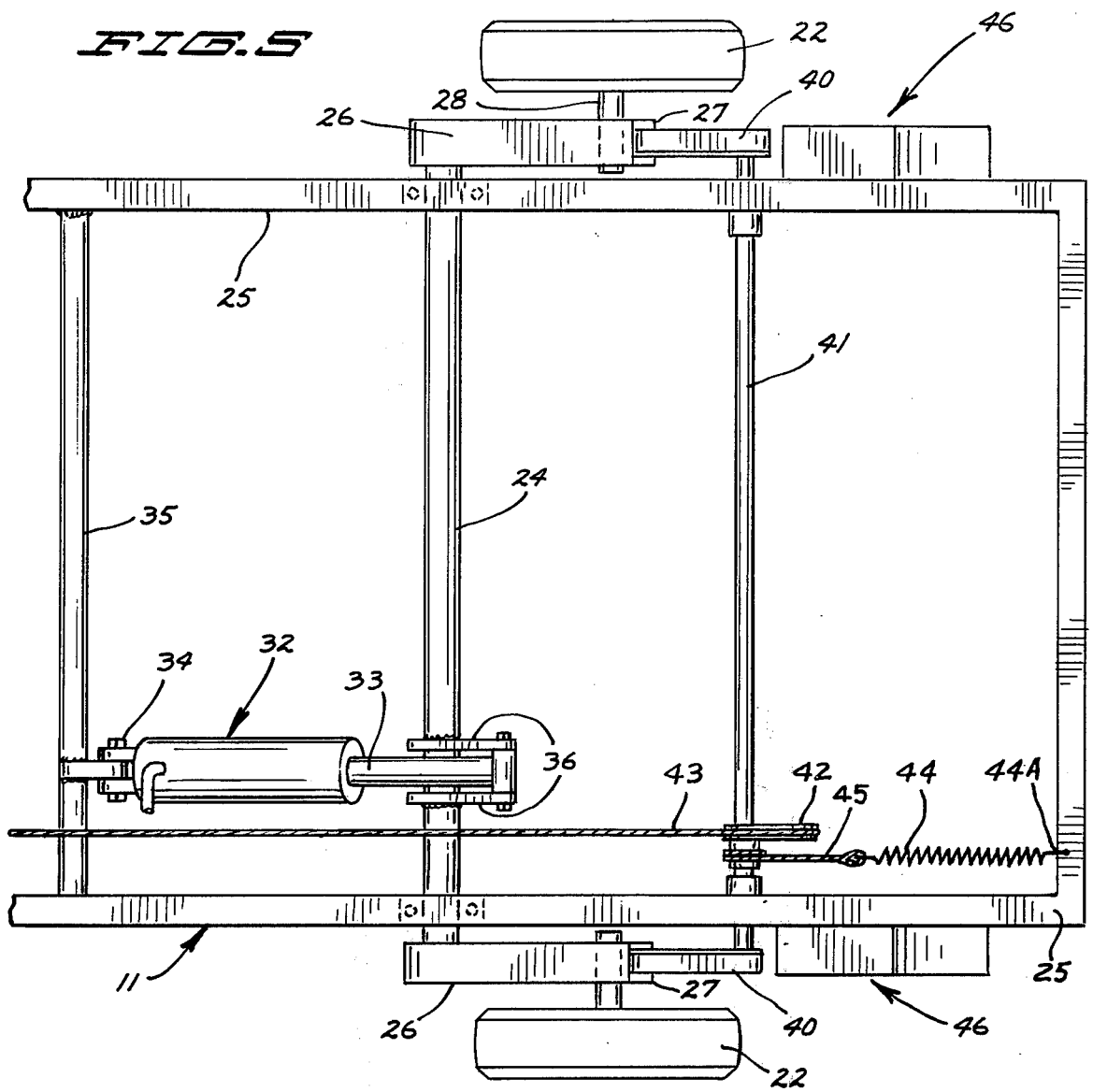
Figure 4:
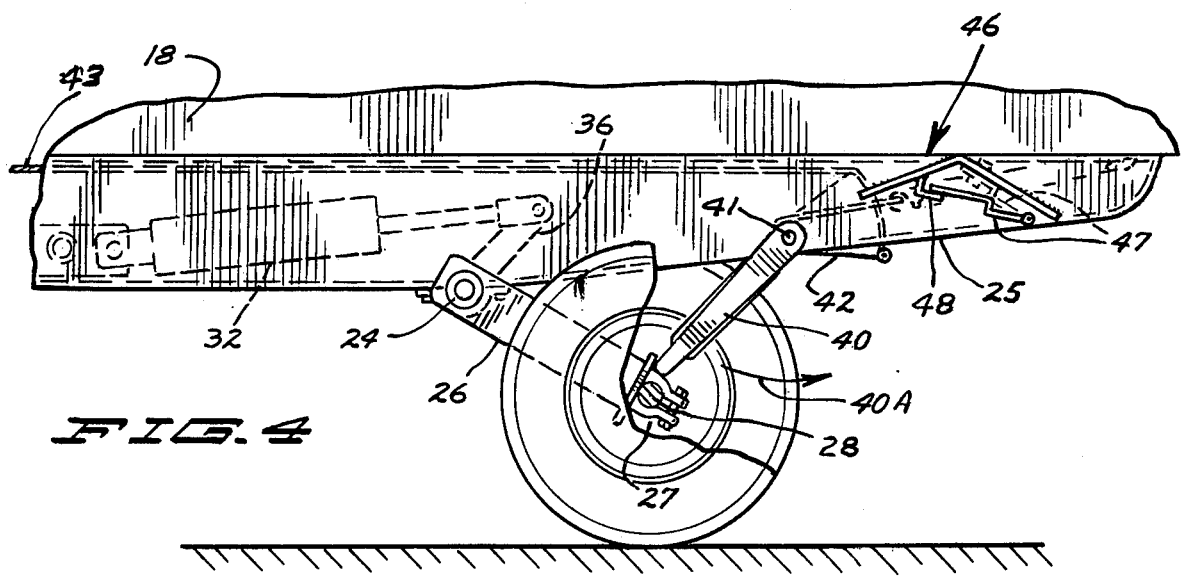
FIG. 4 is side view showing taken on substantially the same line as FIG. 3 showing the frame in a raised position, and with a mechanical lock holding the wheels securely, and with parts broken away.

A tension spring 44 has one end mounted to a frame member as at 44A. The other end is attached to a cable or link chain 45 that is anchored to the pivot tube 41 and wraps partially around the pivot tube. The spring 44 exerts a force through the chain 45 tending to rotate the pivot shaft 41 in clockwise direction. In FIG. 3 the spring 44 is extended a substantial amount and the chain may be wrapped a full turn or more. In FIGS. 1 and 4 with the dogs 40 in working position the cable 45 may be wrapped about one half turn or more.

When the lock dogs 40 are in position as shown in FIG. 4, that is, the frame is raised, the spring 44 is still urging dogs 40 to the lock position shown. The cylinder 32 can be relaxed to let the rod 33 retract slightly so that the dogs 40 will seat or nest against the corner where the plates carrying clamps 27 meet the arms 26, on both sides of the unit and thereby prevent the pivot tube from pivoting in a direction which would permit the frame to lower. This causes the dogs 40 to positively lock the wheels in stack forming position.

When the platform 18 is to be lowered for either loading or unloading a stack from the platform, the platform is rotated to make sure that wheel wells 21 are positioned over the wheels, that is, the platform 18 is properly oriented with respect to the frame, and the cylinder 32 can be actuated through a suitable valve in the normal manner to extend the rod slightly and lift the frame and the lock dogs 40 away from clamps 27. The lock dogs can be rotated counterclockwise as indicated by the arrow 40A to clear the clamps by pulling rope 43. The rope, acting through guide 42 will rotate the pivot tube 41 and the dogs 40 to bring them back up to a latch assembly indicated generally at 46 on each side of the frame. The latches each include a pivoting latch 47 that pivots upwardly, and is held in its position shown in FIG. 4 by a stop 48. When the dogs 40 contact the latches, the latches 47 will pivot upwardly, as shown, and an offset section 49 of each latch will engage the end of the lock dog 40 to prevent it from pivoting back downwardly as shown in FIG. 4. The cable 45 will be wrapped onto pivot tube 41 as the rope 43 is pulled, thus putting more tension in spring 44.

The catch member or lever 47 can be locked out of position by bolting it to the overhead support as shown in doted lines in FIG. 4. The lock dogs 40 can be released from the latches 47 by jerking rope 43 to flip the latches out of the way and quickly releasing the rope. The spring 44, acting through cable 45 will rotate the tube 41 and lock dogs 40 toward locking position.

Once the frame has been lowered, as shown in FIG. 2, the stack can be moved onto or off the bed 18 in a normal manner. The cage 17 would normally be opened or removed when the device is being used as a stack loader, so that certain sections of the cage would be removed from the platform 18.

When the platform is to be raised, the cylinder 32 is operated to extend the rod 33, pushing on the arms 36 and moving the pivot tube about its axis so that the arms 26 lower the wheels relative to the frame (the frame then raises relative to the ground) until the cylinder is extended its full amount. The dogs 40 are snapped into place by jerking the rope 43 as just explained. If the dogs are not being held by the catch 47, the spring 44 will be urging the dogs against the clamps 27 all during the operation. The cylinder 32 is again relaxed to lower the frame slightly until the ends of the lock dogs 40 nest into the corners formed by the respective ends of the arms 26 and the tops of the clamps 27.

About 2 inches of cylinder extension is used for this locking operation. That is, the cylinder will be permitted to retract approximately 2 inches from its full extended position as the wheels are allowed to settle against and lock against the lock dogs 40. Conversely, about two inches of extension of the rod of cylinder 32 can be used when the dogs 40 are to be released. This extension will pivot the arms 26 to a position where the lock dogs 40 will clear the clamps 27 and rope 43 may be used to move the dogs clear of the clamps.

The hydraulic cylinder control insures safe, secure, and low cost operation of a raising and lowering device for haystack movers, and combination haystack machine. It should be noted that in the combination machine, the forward end of the machine is supported on the tractor hitch, so that when the unit is lowered as shown in FIG. 2, the bed will be inclined slightly and the rear portions of the bed 18 will be closely adjacent to the ground surface for ease of loading or unloading stacks.

Mechanism for moving stacks onto and off of beds of stack movers are well known, and any desired arrangement may be employed. These mechanisms generally include a "push off" mounted on platform 18 and power driven to push a stack off the platform. A sling that passes around an existing stack and then is power driven to pull the platform and stack together is generally used for reloading.

A further reference is made to copending application Ser. No. 416,072, filed Nov. 15, 1973 entitled Mobile Hay Stacker Conveyor Construction, which shows a stacking machine having a hay conveyor of the type shown in the drawings of the present application.

What is claimed is:

1. A haystack forming machine comprising a bed for forming a stack and which is adapted for removing stacks from the bed and replacing stacks onto the bed including a frame, at least one separate wheel on each of the opposite sides of said frame, means to mount said wheels on said frame including a tube member extending transversely of said frame and pivotally mounted thereto, arm means fixed to opposite ends of said tube member, said wheels being attached to outer ends of said arm means, means to control pivotal movement of said tube member and said arm means comprising a hydraulic cylinder, whereby said wheels may be swung in an arc relative to said pivot and said frame to thereby lower portions of said frame relative to the ground or raise said portions upon opposite movement of said hydraulic cylinder, and mechanical latch means engageable with said arm means adjacent to the mounting of at least one of said wheels to said arm means, said mechanical latch means being pivotally mounted to said frame member and positionable to directly mechanically engage said arm means to support said frame relative to said arm means independently of said means to control movement.

2. The combination as specified in claim 1 and rope control means for at least partially controlling the pivotal movement of said latch means.

3. The combination as specified in claim 2 and means to retain said latch means in position spaced from said arm means to prevent interference of said latch means with said arm means.

4. The combination as specified in claim 1 wherein said latch means are pivotally mounted on said frame on an axis, spring means mounted to cause said latch means to move toward a position engaging said arm means.

5. Means for supporting the bed of a stacking machine used to form stacks of forage crop material to permit raising and lowering of said bed comprising a frame, a shaft pivotally mounted to the frame and extending transversely thereto, a pair of spaced arms fixed to said shaft, a separate support wheel mounted to each of said arms, a hydraulic cylinder, means to connect said hydraulic cylinder between said frame and said shaft to cause rotation of said shaft as said hydraulic cylinder is extended or retracted, said arms being positioned to permit said wheels to move relative to said frame to lower said frame adjacent to the ground, and to raise the frame to a preselected position, and pivoting mechanical lock dog members mounted on said frame and pivotable to engage at least one of said arms to support the engaged arms with the frame in a raised position.

6. The combination as specified in claim 5 wherein said stacking machine includes a rotatable platform, wheel well means along lateral sides of said platform, said wheel well means being of size to permit portion of said wheels to move relative to the frame above the normal level of said platform.

7. The combination as specified in claim 5 and latch members for holding said lock dog members in an inoperative position.

* * * * *